United States Patent [19]
Mimura

[11] Patent Number: 5,325,189
[45] Date of Patent: Jun. 28, 1994

[54] IMAGE PROCESSING WITH A MULTIPLE-MEMORY APPARATUS

[75] Inventor: Toshihiko Mimura, Yokohama, Japan

[73] Assignee: Canon Kabushiki Kaisha, Tokyo, Japan

[21] Appl. No.: 527,440

[22] Filed: May 23, 1990

[30] Foreign Application Priority Data

May 23, 1989 [JP] Japan .................................. 1-129300
  Jun. 2, 1989 [JP] Japan .................................. 1-140747

[51] Int. Cl.$^5$ ............................................. H04N 9/04
[52] U.S. Cl. ....................................... 348/231; 348/715
[58] Field of Search ................... 358/37, 42, 44, 41; H04N 9/04

[56] References Cited

U.S. PATENT DOCUMENTS

| | | | |
|---|---|---|---|
| 4,862,271 | 8/1989 | Smith et al. | 358/37 X |
| 4,882,623 | 11/1989 | Uchikubo | 358/37 X |
| 4,961,110 | 10/1990 | Nakamura | 358/37 |
| 5,103,301 | 4/1992 | Cosentino | 358/42 |

Primary Examiner—Mark R. Powell
Attorney, Agent, or Firm—Fitzpatrick, Cella, Harper & Scinto

[57] ABSTRACT

An image processing apparatus for receiving digitized image data, dividing the received image data into a plurality of memory regions in units of a predetermined quantity and storing the same, simultaneously reading the image data stored in the plurality of memory regions by the predetermined quantity and supplying the image data, which have been simultaneously read out, to a vertical digital filter processing.

12 Claims, 17 Drawing Sheets

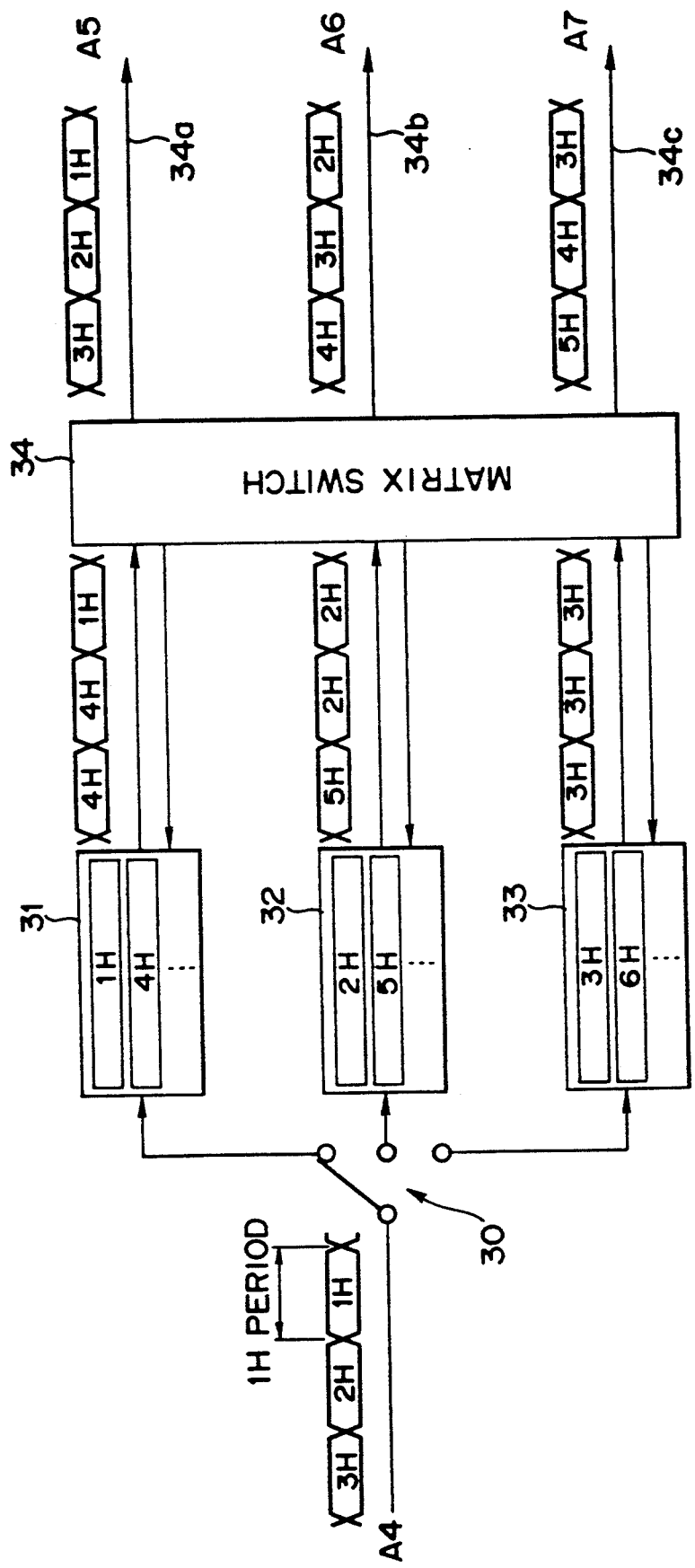
F I G. 2

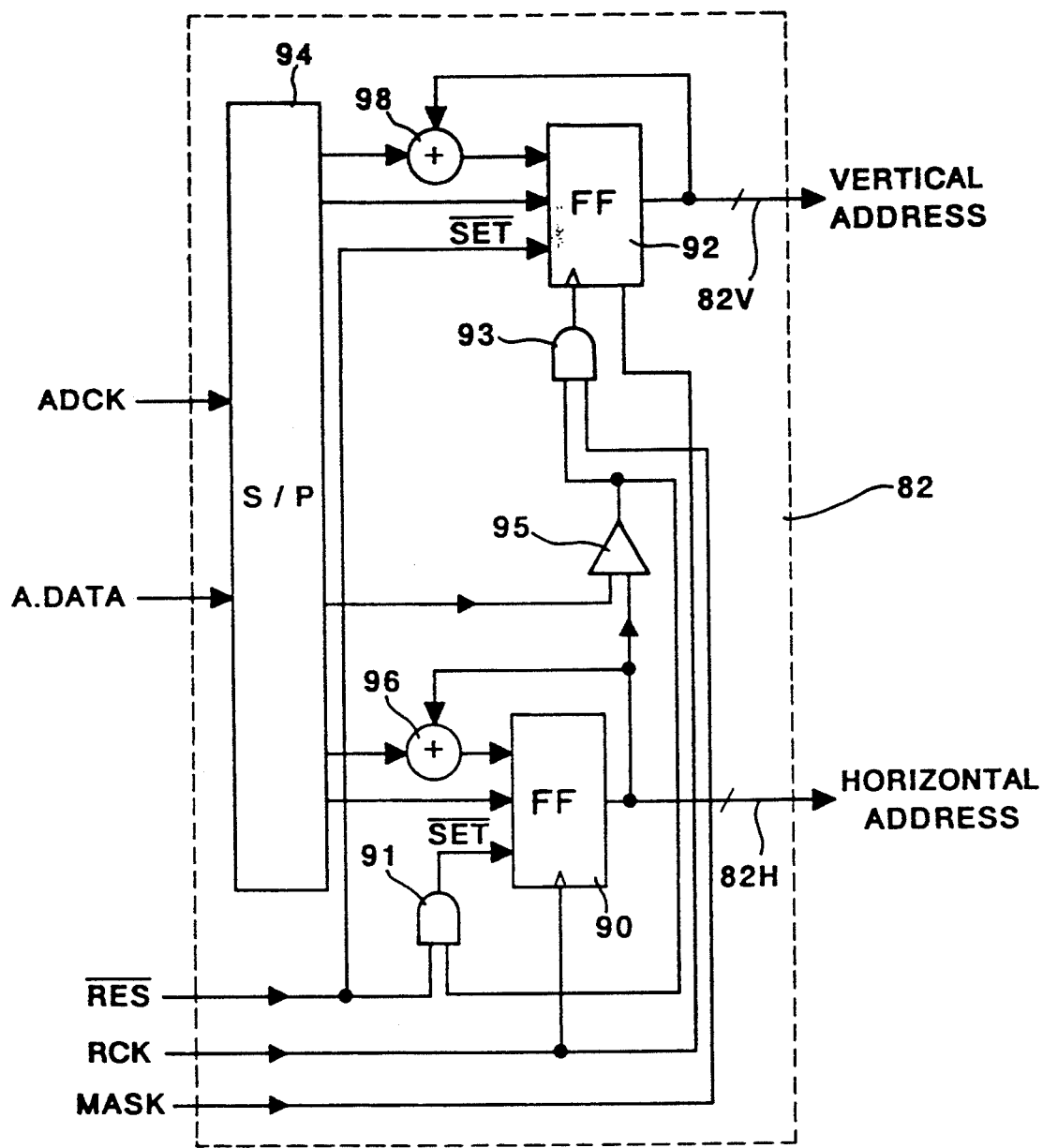
F I G. 8

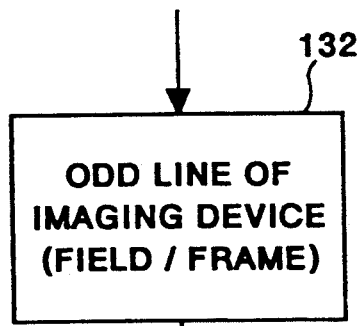
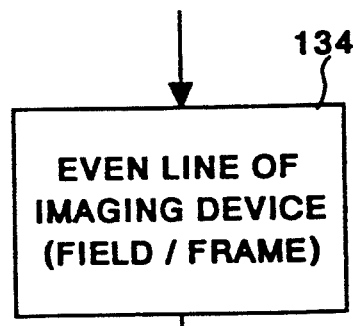
FIG. 10A          FIG. 10B
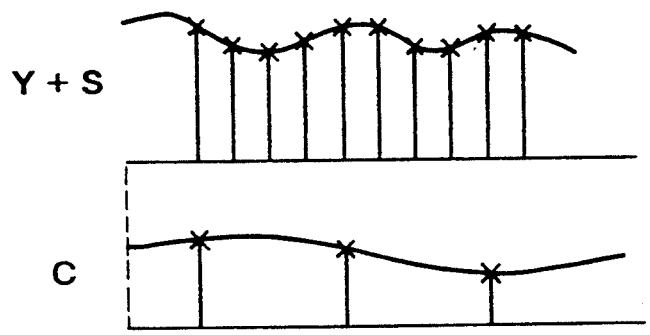
FIG. 11
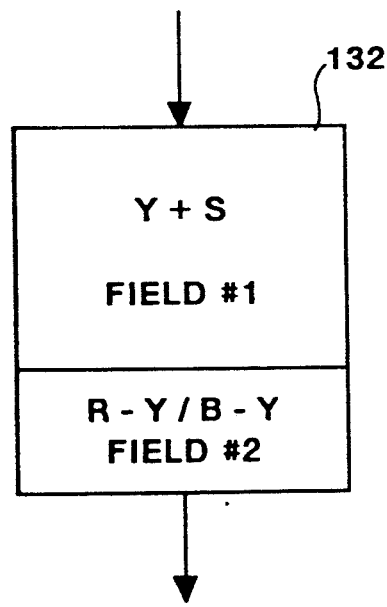
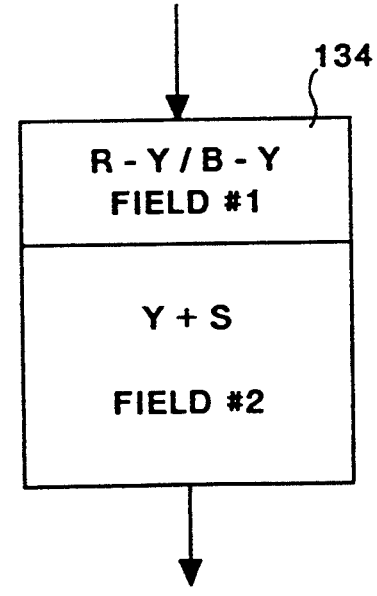
FIG. 12A          FIG. 12B

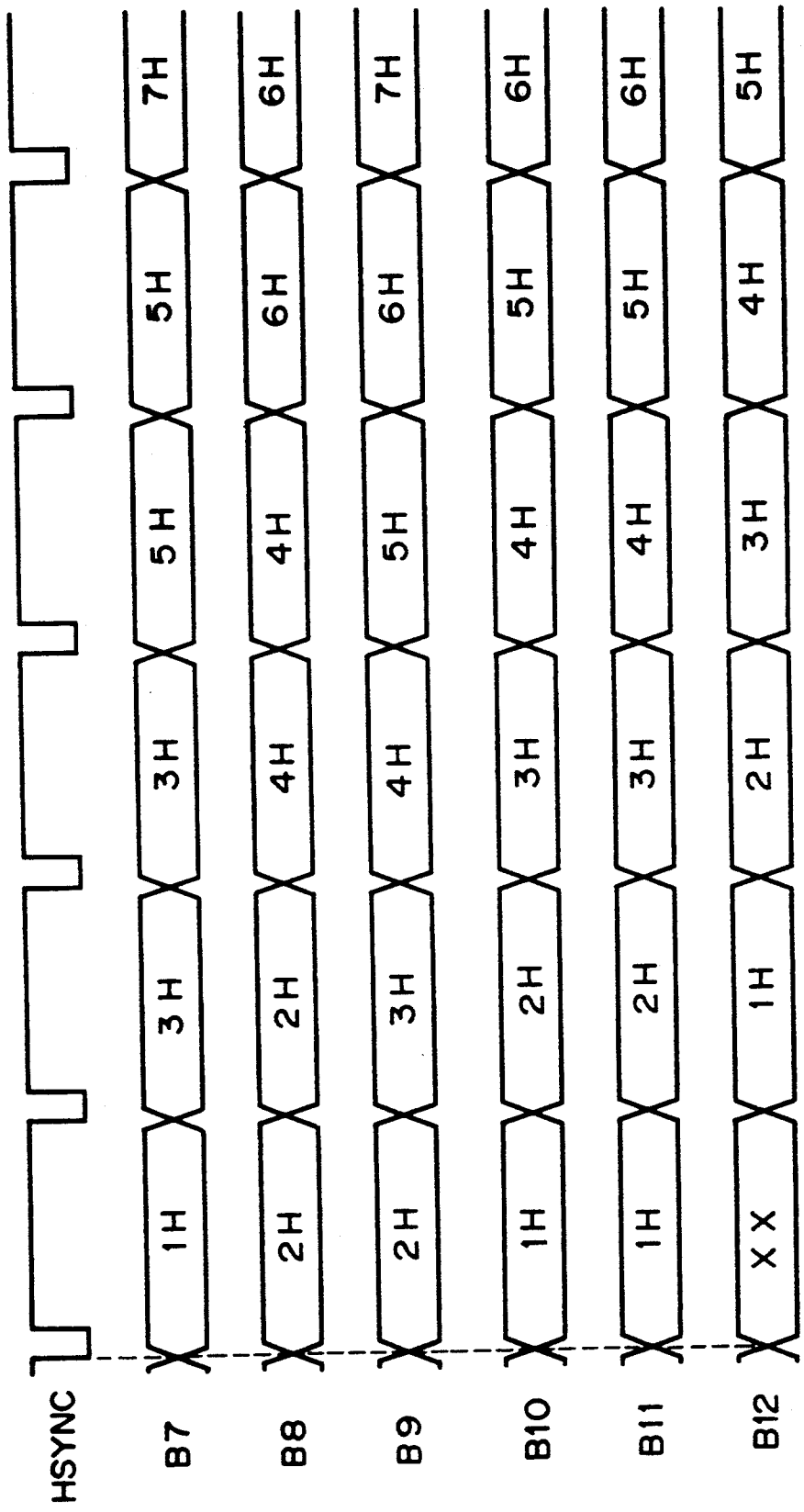
F I G. 15

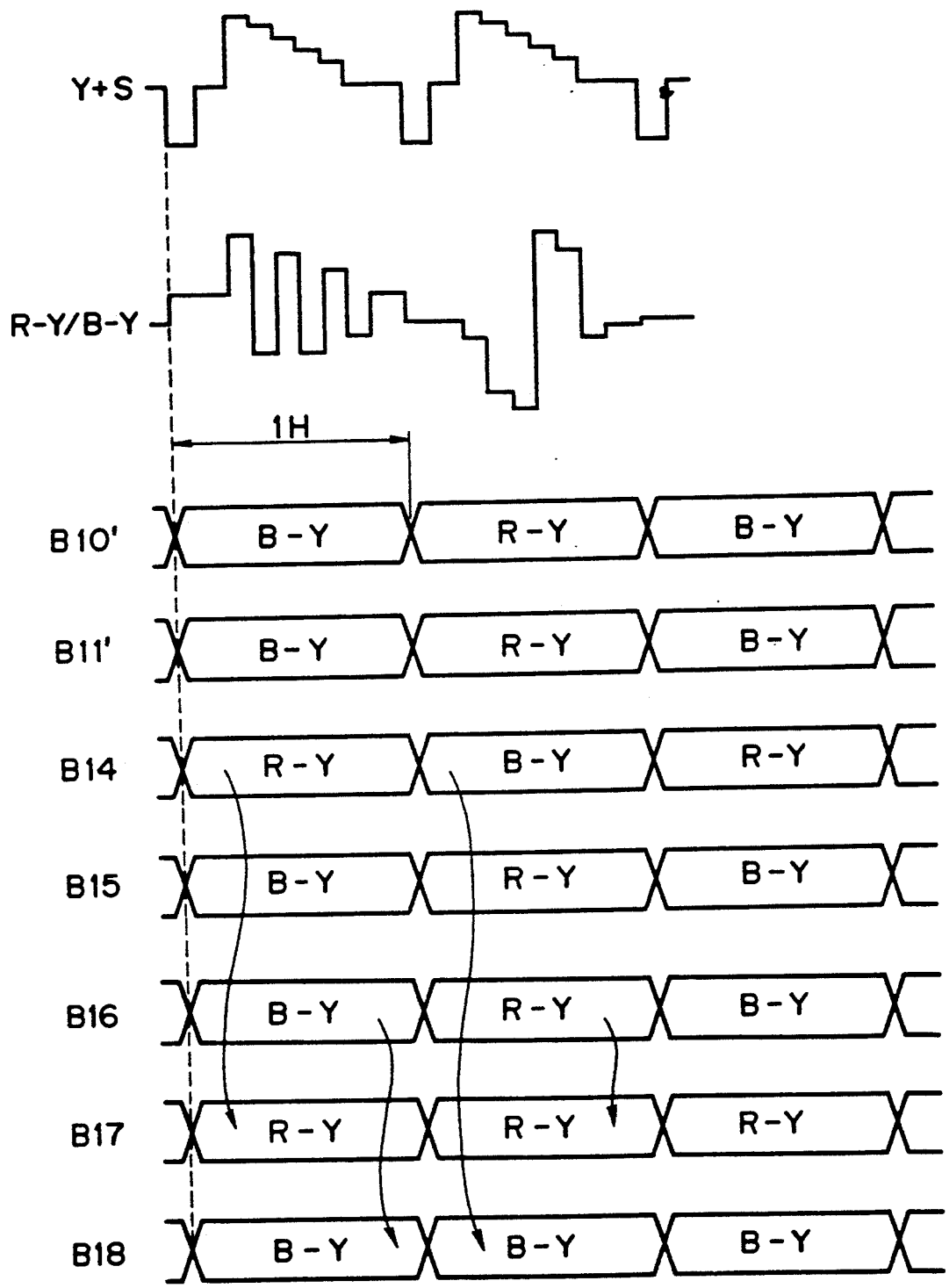
F I G. 17

IMAGE PROCESSING WITH A MULTIPLE-MEMORY APPARATUS

BACKGROUND OF THE INVENTION

1. Field of the invention

The present invention relates to an image processing apparatus for use in, for example, an electronic still camera including a serial I/O type image memory.

2. Description of the Related art

Recently, electronic still cameras using a multiplicity of semiconductor memories have attracted public attention since large-capacity semiconductor memories have become available. In an electronic still camera, a switch-Y signal (a switch brightness signal) obtained by switching, for example, the RGB output of the imaging device is temporarily supplied to an FIFO (First-In First-Out) memory. A 1H delay signal and a 2H delay signal are formed by two 1H line memories by using the output from the above-described FIFO memory. The output from the FIFO memory, the 1H delay signal and the 2H delay signal are supplied to a vertical finite impulse response type filter (a vertical FIR type filter) so as to be subjected to a vertical aperture compensation. As a result, the brightness signal can be obtained.

Also, a processing is conducted in which R, G and B signals are fetched from the 1H delay signal, the thus fetched R, G and B signals are subjected to a horizontal FIR filter processing and converted into color difference signals R-Y and B-Y so that the color difference signals R-Y and B-Y are made line sequential.

The brightness signal and the line sequential color difference signal thus obtained are clamped and subjected to a blanking processing. Then, a combined synchronizing signal is added to the brightness signal so that an image is magnetically recorded on a video floppy disk by a know magnetic recording/reproducing apparatus.

However, according to the above-described conventional apparatus, two 1H line memories must be provided in addition to the FIFO memory of a predetermined capacity. It leads to a problem in that the size of the circuit in the apparatus is excessively enlarged and the manufacturing cost is thereby increased.

Furthermore, image memory devices for storing image data, in particular, storing TV image data have been widely used recently since the large capacity semiconductor device have become available. In a case where a TV image data is stored, the necessity of applying the full address to the I/O of the image memory device can be eliminated, but the address value successively changing from a predetermined value must be automatically generated. That is, the FIFO memory is used. If the FIFO memory is employed as the image memory device, the memory control can be easily implemented. Therefore, an advantage can be obtained in that the necessary number of control signal lines can be reduced and the circuit can thereby be cheaply manufactured.

However, a problem arises, when only desired data is fetched in the case where a considerably complicated processing of signals is conducted, the desired data cannot be quickly fetched. For example, in the case of a still image transmitting device such as the visual telephone, processing in which data transmission is performed with omitting predetermined pixels or processing of again transmitting data which has not been received satisfactorily cannot be quickly completed if the FIFO memory is used. In order to quickly complete the above-described processings, the circuit becomes excessively complicated.

SUMMARY OF THE INVENTION

An object of the present invention is to overcome the above-described problems experienced with conventional apparatus.

Another object of the present invention is to provide an image processing apparatus employing an image memory the size and cost of which can be reduced.

A further object of the present invention is to provide an image processing apparatus employing an image memory capable of quickly and repeatedly reading/writing image data on the same line and eliminating the necessity for generating the address.

A still further object of the present invention is to provide an image processing apparatus employing an image memory onto which data can be written at an optional position thereof and the same can be read from an optional position thereof.

Another object of the present invention is to provide an image processing apparatus the size and cost of which can be reduce.

Another object of the present invention is to provide an image processing apparatus capable of effectively reading/writing image data .necessitating reduced number of blocks of the memory device.

Another object of the present invention is to provide an image processing apparatus structured in such a manner that a frame memory thereof is divided into two sections for purpose of using it as a memory for making signal status homogeneous in such a manner that color difference signal is made line sequential and as well using it as a line memory at the recording mode.

Another object of the present invention is to provide an image processing apparatus in which the number of line memories for use as the vertical digital filter can be reduced.

Another object of the present invention is to provide an image processing apparatus comprising: receiving means for receiving digitized image data; storage means for storing the received image data in such a manner that the storage means divides the received image data into a plurality of memory regions; read means for simultaneously reading the image data stored in each of the plurality of memory regions; and supply means for supplying the image data which have been simultaneously read out to a vertical digital filtering process.

Another object of the present invention is to provide an image processing apparatus comprising: storage means for storing image data as data to be stored at a recording mode and storing data to be reproduced as data to be stored at a reproducing mode; receiving means for receiving digitized data to be stored; divide/storage means for dividing the received data to be stored into two sections and storing the thus divided data; read means for reading the divided and stored data; and delay means for delaying either portion of the stored data than another portion of the data.

Another and further objects, features and advantages of the invention will be apparent more fully from the following description.

BRIEF DESCRIPTION OF THE DRAWINGS

FIG. 2 illustrates the flow of data according to the first embodiment of the present invention;

FIG. 8 is a circuit diagram which illustrates the detailed structure of a read counter 82 according to the first embodiment of the present invention;

FIGS. 10A and 10B illustrate a state in which the FIFO memory is used when the recording is performed in the structure according to the second embodiment of the present invention;

FIG. 11 illustrates a sampling point of a reproduction signal according to the second embodiment of the present invention;

FIGS. 12A and 12B illustrate a state in which the FIFO memory is used when the reproduction is performed in the structure according to the second embodiment of the present invention; and FIGS. 13 to 17 are timing charts which illustrate the timing of each of essential image signals according to the second embodiment of the present invention.

DETAILED DESCRIPTION OF THE PREFERRED EMBODIMENTS

Preferred embodiments of the present invention will now be described in detail with reference to the drawings.

First Embodiment

Figure 1A:
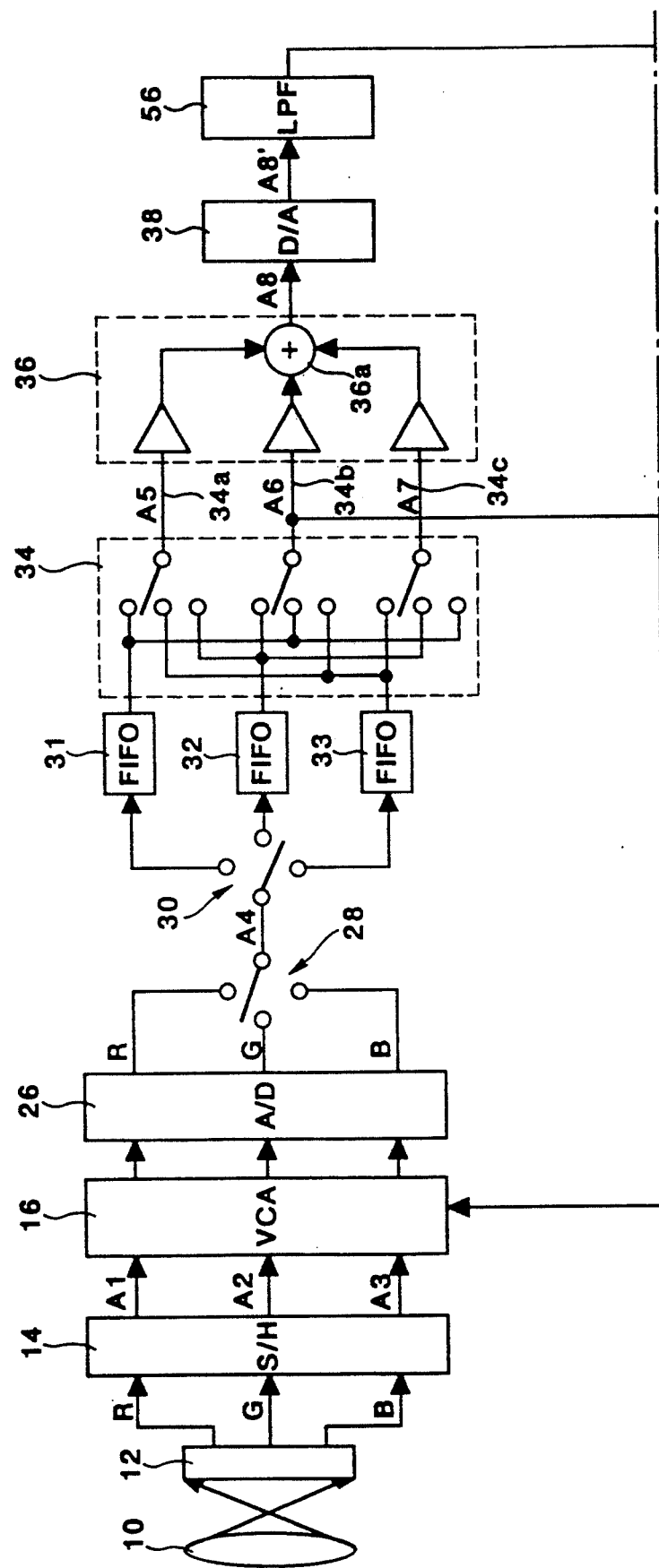
FIGS. 1A and 1B are block diagrams which illustrate the structure of a first embodiment of an electronic still camera to which the present invention is applied.
Figure 1B:
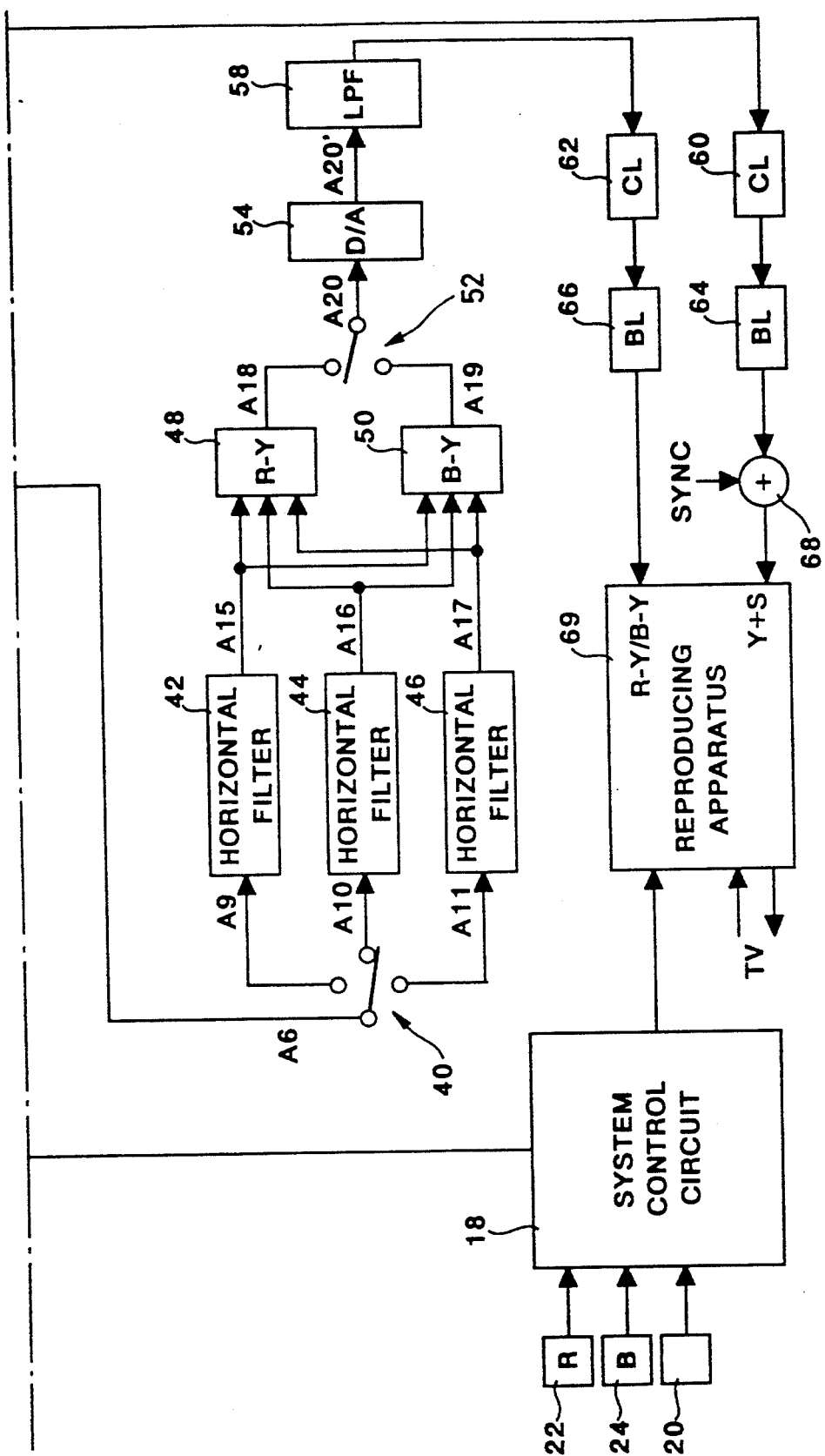
Figure 3:
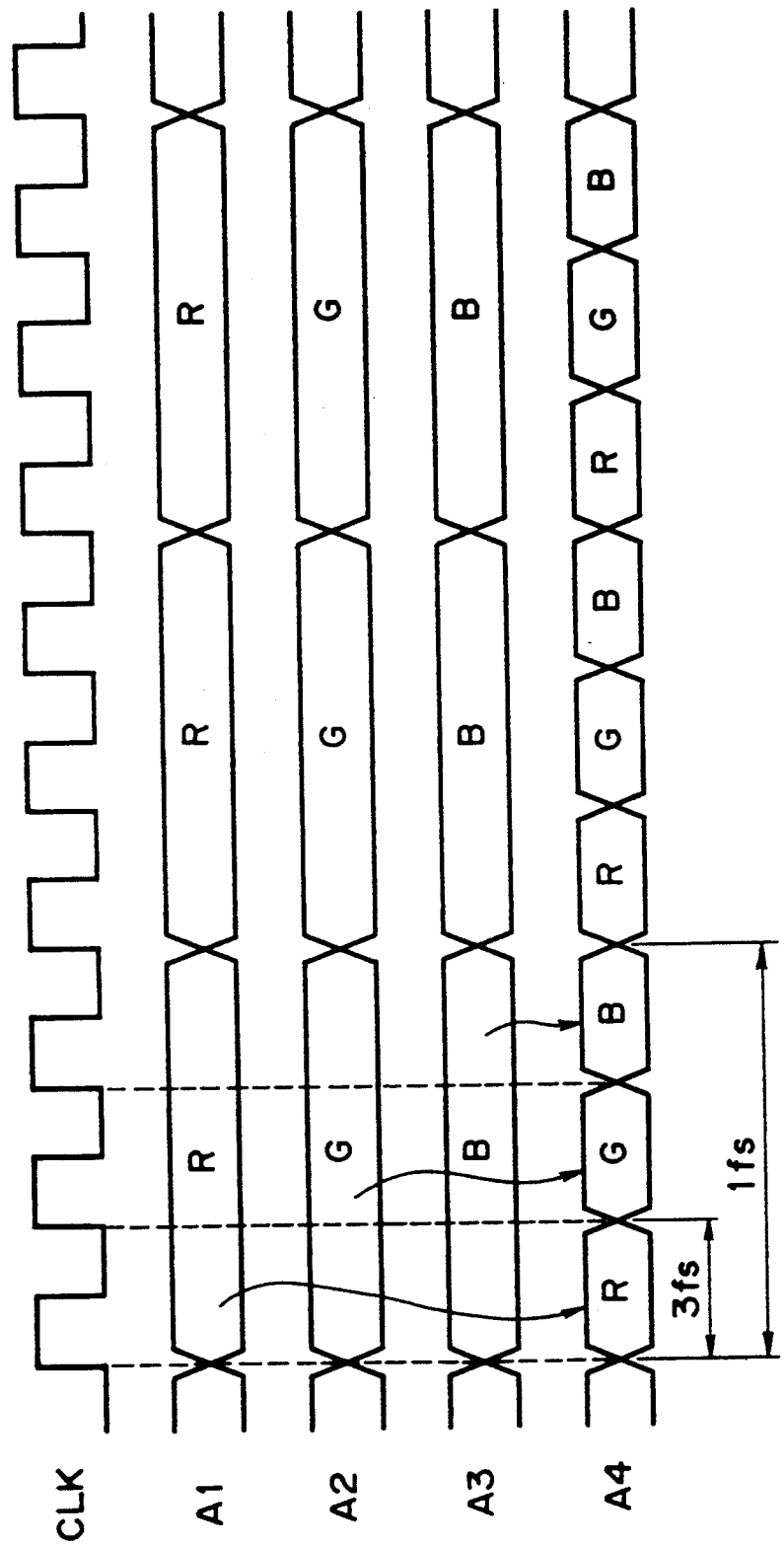
FIGS. 3 to 6 are timing charts which illustrate the timing of each of essential image signals according to the first embodiment of the present invention.

FIGS. 1A and 1B are block diagrams which illustrate a first embodiment of an electronic still camera to which the present invention is applied. In order to easily understand the drawings, clock signal lines and clock signal generating circuits for the corresponding circuits are omitted here. Referring to FIGS. 1A and 1B, reference numeral 10 represents an imaging lens, 12 represents an imaging device equipped with an RGB stripe filter. Reference numeral 14 a sample/hold circuit (S/H circuit), 16 represents a level adjustment circuit (VCA), 20 represents an exposure sensor, 22 represents an R-sensor and 24 represents a B-sensor. Reference numeral 2 6 represents an A/D converter, and 28, 30 and 40 represent switches each of which has a triple-speed switch function which usually performs switching at a speed of 3 fs with respect to a speed of 1 fs. Reference numerals 31, 32 and 33 represent FIFO memories each of which has a structure shown in FIGS. 7 and 8 to be described later. Reference numeral 34 represents a matrix switch, and 34a, 34b and 34c represent taps provided on the output side of the matrix switch 34. Reference numeral 36 represents a vertical filter of a finite impulse response type, 36a represents an adder and 38 represents a D/A converter.

Reference numerals 42, 44 and 46 represent horizontal filters and 48 and 50 represent color difference matrix circuit. Reference numeral 56 and 58 represent low-pass filter (LPF), 60 and 62 represent clamp circuits, and 64 and 66 represent blanking circuits. Reference numeral 68 represents an adder, and 69 represents a recorded picture reproducing apparatus.

Symbols A1 to A20 represent essential image signals.

The operation of the electronic still camera thus structured will now be described.

FIG. 2 illustrates the flow of data according to the first embodiment, and FIGS. 3 to 6 are timing charts each of which illustrates the timing of the essential image signals according to the first embodiment.

First, the imaging device 12 converts an optical image of a subject supplied from the imaging lens 10. The S/H circuit 14 samples/holds each of R, G and B electric signals (image signals or image data) output from the imaging device 12. As a result, the image signals A1 to A3 representing only the image portion are fetched. The VCA 16 adjust the level of each of R, G and B output signals supplied from the system control circuit 18. Specifically, the level of each of the R, G and B outputs from the S/H circuit 14 is, in accordance with the output from the exposure sensor 20, adjusted in order to realize a proper exposure. In order to adjust the color balance, the level of the R-signal and that of the B-signal are adjusted in accordance with the output from each of the R-sensor 22 and the B-sensor 24. The A/D converter 26 digitizes each of the R, G and B output signals from the VCA 16, the A/D converter 26 as well clamping a signal representing an optical black portion of the imaging device 12 so as to output a signal obtained by $\gamma$-converting the clamped optical black portion by utilizing the $\gamma$-characteristics of a resistance ladder. By virtue of the switch 28, a switch brightness signal, that is the switch-Y signal A4 is formed from each of the R, G and B output signals from the A/D converter 26. The switch-Y signal is a sequential signal with which each of the R, G and B image signals are passed at the triple speed. The switch Y signal is, for each line, circularly distributed to the FIFO memories 31, 32 and 33 by switching the switch 30 for each line. That is, assuming that the uppermost line of the image taken by the imaging device 12 is arranged to be the first line and symbol m represents an integer, the first line, the fourth line, the seventh line, ..., the (3m+1) th line signals are written on the FIFO memory 31. The second line, the fifth line, the eighth line, ..., the (3m+2) line signals are written on the FIFO memory 32. The third, the sixth, ..., the (3m+3) line signals are written on the FIFO memory 33. As shown in FIG. 2, the flow of the signals successively occur for each line so that the switch-Y signal is supplied through the switch 30 is supplied for one line at a period of 1H (horizontal line). The FIFO memories 31, 32 and 33 must be able to repeatedly read out data stored on the same line or must be able to read out data stored on the specified line. In the case where the former memory of the former type is employed, it is necessary to arrange the structure, for example, in such a manner that the increment pulse supplied from a horizontal read counter can be masked by an external control signal. In the case where the latter one is employed, it is necessary to arrange the structure in such a manner that each of the horizontal read counter and the vertical access counter can be changed to have a specified width.

Referring to FIG. 2, in the case of the FIFO memory 31, the switch-Y signal, written in the sequential order: the first line and the fourth line, is read out in the sequential order: the first line, the fourth line and the fourth line. As described above, reading of the four line is repeated. Similarly, in the case of the FIFO memory 32, the reading of the second line is conducted twice. In the case of the FIFO memory 33, the third line is repeatedly read by three times. All of the lines are read three times successively in a normal flow except the first line, the second line, the final (3m+2) line and the (3m+3) line.

The Matrix switch 34 simultaneously reads out the signal of each of the FIFO memories 31, 32 and 33, and rearranges the signals by its matrix switch mechanism so as to simultaneously fetch the signals for the three lines in such a manner that the line numbers of the lines are made sequential. For example, as shown in FIG. 2, the signal for the first line is fetched from the FIFO memory 31, that for the second line is fetched from the FIFO memory 32 and that for the third line is fetched from the FIFO memory 33. The thus fetched signals are, as it is, output by the matrix switch 34 without rearranging the lines. Then, at the same timing, the signal for the second line is again read from the FIFO memory 32 and that for the third line is also again read from the FIFO memory 33. Similarly, the signal for the next fourth line is read from the FIFO memory 31. The matrix switch 34 rearranges the lines of the signals and is so switched that the signal for the second line is output from the tap 34a, that for the third line is output from the intermediate tap 34b and that for the fourth line is output from the tap 34c. Similarly, the matrix switch 34 outputs, at the next timing, outputs the signal for the third line through the tap 34a, that for the fourth line through the intermediate tap 34b and that for the fifth line through the tap 34c. Thus, signals can be obtained from the three taps 34a, 34b and 34c of the matrix switch 34 by simultaneously reading the image signals from the three lines disposed adjacently in the sub-scanning direction of the image signal supplied to the imaging device 12. Furthermore, the signals read from the lines are obtained at the taps 34a, 34b and 34c in the sub-scanning direction, that is, read in such a manner that the line to be read is lowered one by one. Thus, the tap 34a outputs the switch-Y signal A5 in the sequential order of the first line, the second line and the third line,. ... The tap 34b outputs the switch-Y signal A6 in the sequential order of the second line, the third line and the fourth line, . . . . The tap 34c outputs the switch-Y signal A7 in the sequential order of the third line, the fourth line, the fifth line, . . . .

The vertical filter 36 is supplied with the three switch-Y signals outputted from the matrix switch 34 so as to be aperture compensated. A signal output from the vertical filter 36 is the signal A8 shown in FIGS. 1A and 4. The signal A8 is again made an analog signal by the D/A converter 38 so as to be output, as a pseudo brightness signal (pseudo Y-signal) A8', to an LPF 56 disposed next to the D/A converter 38.

Figure 4:
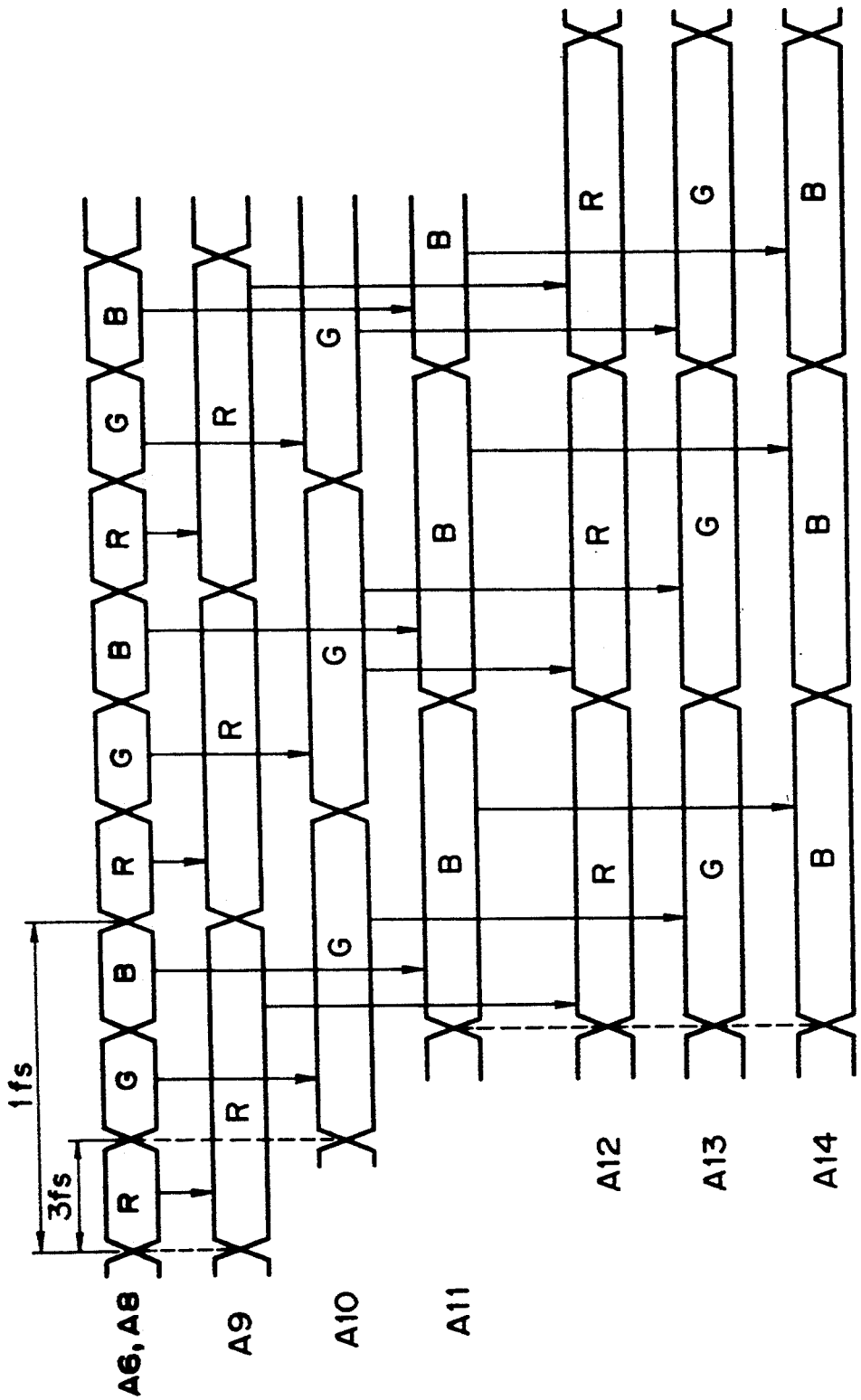
Figure 5:
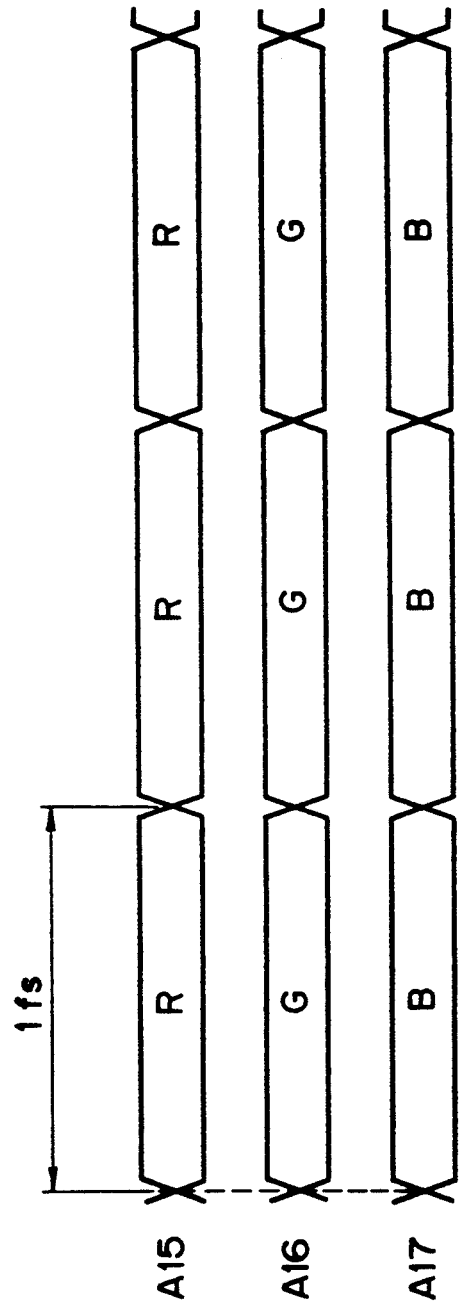

On the other hand, the switch-Y signal from the intermediate tap 34b of the switch 34 is, by the switch 40, decomposed into the original R, G and B switch-Y signals. The thus decomposed R, G and B switch-Y signals are respectively subjected to the horizontal band limitation operation performed by the horizontal filters 42, 44 and 46 before supplied to the matrix circuits 48 and 50. As shown in FIG. 4, in the horizontal filters 42, 44 and 46, the timing of the switch-Y signals A9, A10 and A11 is synchronized with each other by a latch (omitted from illustration) when the horizontal filters 42, 44 and 46 receive the switch-Y signals A9, A10 and A11 supplied by the switching operation of the switch 40.

Figure 6:
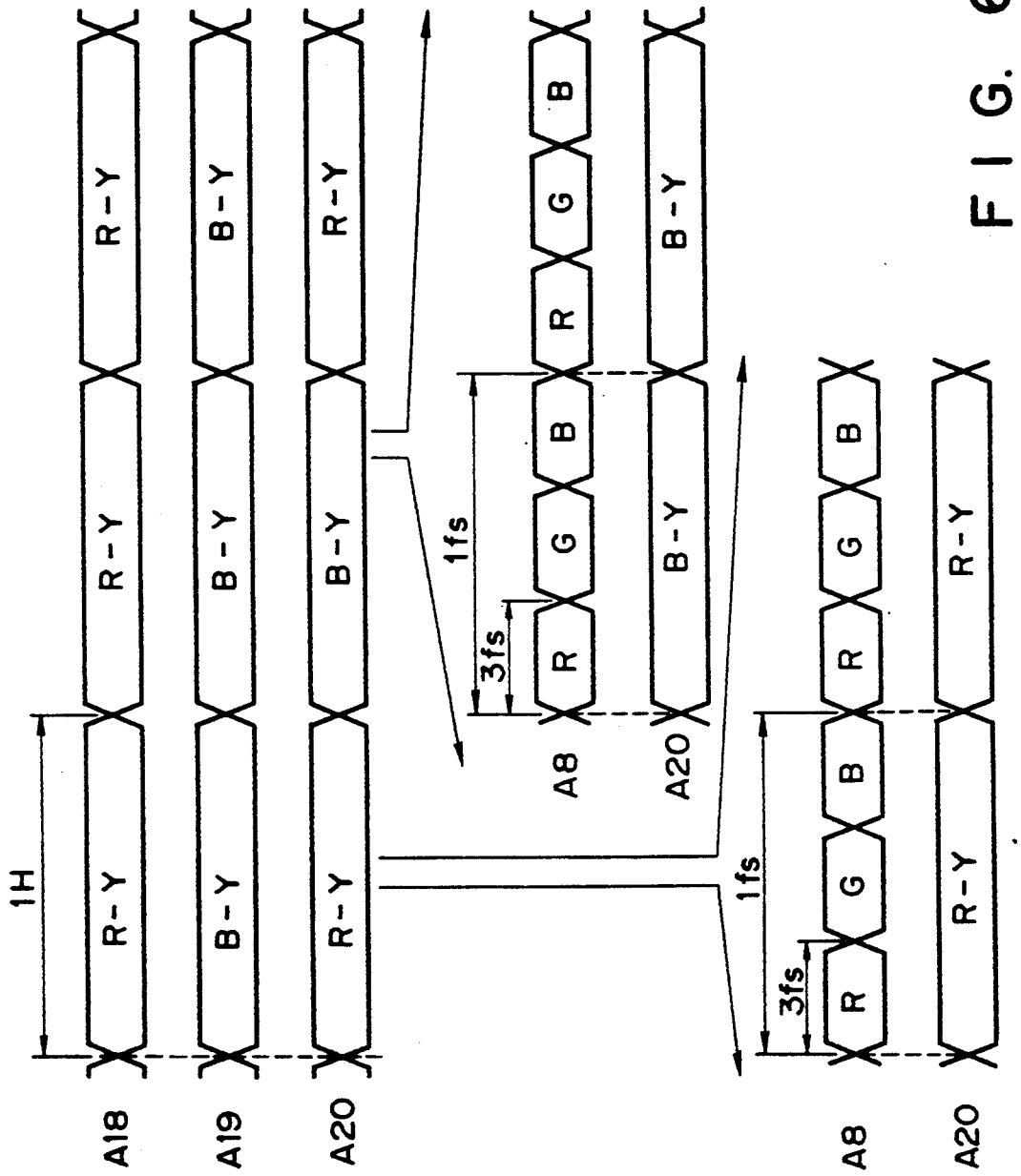

In the color difference circuit 48, processing to convert the above-described signals into color difference signal R-Y is performed, while processing to convert the above-described signals into the color difference signal B-Y is performed in the color difference matrix circuit 50. The output signals R-Y and B-Y from the color difference matrix circuits 48 and 50 are made line sequential by switching the switch 52 for each line. The thus-obtained line sequential signal is, as shown in FIG. 6, a line sequential color difference signal A20 which alternately transmits the R-Y and B-Y output signals, the color difference signal A20 being then converted into an analog signal by a D/A converter 54 disposed next to the color matrix circuits 48 and 50.

The pseudo Y-signal A8' output from the D/A converter 38 and a color difference signal A20' outputted from the D/A converter 54 are respectively subjected to the band limitation operation performed by the LPFs 56 and 58, are clamped by the clamp circuits 60 and 62, and subjected to a blanking operation by the blanking circuit 64 and 66. A synchronizing signal is overlapped on the output from the blanking circuit 64 by the adder 68. The output from the blanking circuit 62 is supplied to an input terminal of the recorded picture reproducing apparatus 69, the above-described input terminal being arranged to receive the color difference signal. The output from the adder 68 is supplied to the input terminal of the recorded picture reproducing apparatus 69, the above-described input terminal being arranged to receive the brightness signal. As a result, the thus supplied signals are recorded on a recording medium such as a magnetic disk and a solid memory device.

According to the first embodiment shown in FIGS. 1A and 1B, the recording brightness signal is formed from the switch-Y signal. Another structure may be employed arranged in such a manner that a high frequency component is fetched from the switch-Y signal so as to make the $Y_H$ signal, while and a low frequency component $Y_L$ signal is formed from the RGB signal so as to synthesize the thus formed two signals and form a recording brightness signal. Furthermore, another structure may be employed arranged in such a manner that a compensating signal of the switch-Y signal is formed from the color difference signal so as to be added to the switch-Y signal and to form the recording brightness signal.

Although the RGB stripe filter is employed according to the first embodiment, the present invention is not limited to the above-described description. In addition, the arrangement of the pixels of the imaging device 12 may be arranged variously, for example, in a square configuration or a two-dimensionally offset arrangement.

The FIFO memories 31 to 33 will now be described in detail.

Since the FIFO memories 31 to 33 have the same structure, the description will be made about the FIFO memory 31.

Figure 7:
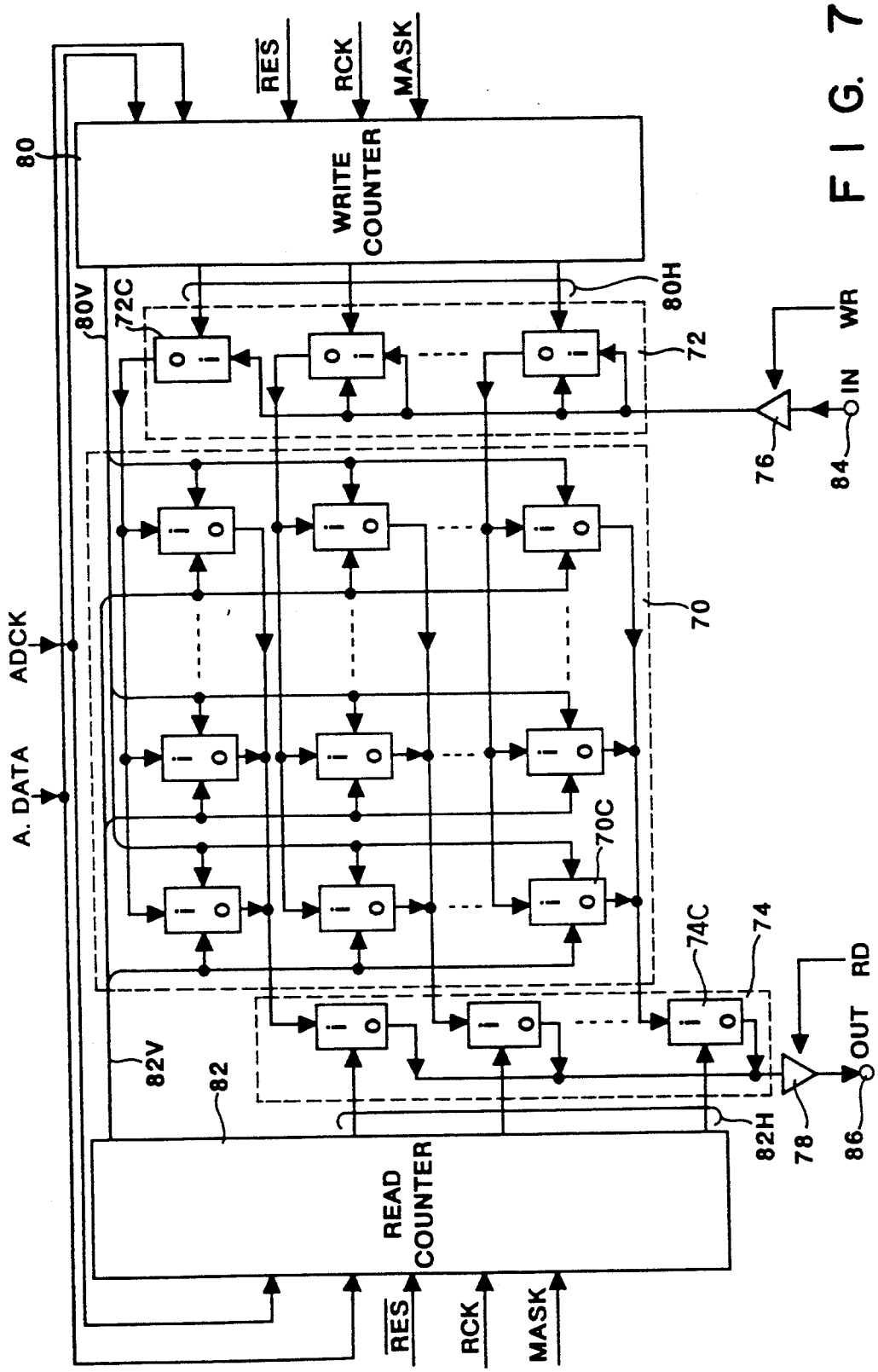
FIG. 7 is a circuit diagram which illustrates the structure of an essential portion of a FIFO memory 31 according to the first embodiment of the present invention.

FIG. 7 is a circuit diagram which illustrates the structure of the essential portion of the FIFO memory 31. Referring to the drawing, reference numeral 70 represents a storage portion in which a predetermined number of memory cells 70C are two dimensionally arranged. Reference numeral 70C represents the memory cell and 72 represents a write register having a capacity for one line. Reference numeral 72C represents a memory cell of the write register 72 and 74 represents a read register having a capacity for one line. Reference numeral 74C represents a memory cell for the read register 74 and 76 represents a buffer. Reference numeral 78 represents an output buffer and 80 represents a write counter. Reference numeral 82 represents a read counter and 84 represents an input terminal through which image data to be written is received. Reference numeral 86 represents an output terminal through which image data which has been read out is outputted.

The basic I/O operation of the circuit shown in FIG. 7 will now be described.

Image data supplied to the input terminal 84 is supplied to the write register 72 via the input buffer 76. The writing operation of each of the cells 72C of the write register 72 is controlled by a horizontal address signal 80H supplied from the write counter 80. When image data for one line has been written in the write register 72, the write counter 80 specifies, by using a vertical address signal 80V therefrom, the memory cell of the storage portion 70 in which data of the write register 72 is to be written. The thus arranged specifying operation is usually conducted circularly. As a result, image data written in the write register 72 is transferred to a predetermined position in the storage portion 70.

On the other hand, the read counter 82 specifies, by using a vertical address signal 82V, the memory cell 70C of the storage portion 70 from which image data to be read out. As a result, data in the specified memory cell 70C is transferred to the corresponding memory cell 74C in the read register 74. Image data transferred to the read register 74 are selected, by a horizontal address signal 82H supplied from the read counter 82, successively read out from the memory cells 74C so as to be supplied to the output terminal 86 from the output buffer 78.

As a result of the above-described operation, data supplied to the input terminal 84 is outputted from the output terminal 86 in accordance with the sequential order of the input. That is, the operation FIFO is performed.

FIG. 8 is a circuit diagram which illustrates the detailed structure of the read counter 82 according to the first embodiment. Since the write counter 80 is arranged to have the same structure as that of the read counter 82, its description is omitted here.

Referring to FIG. 8, reference numeral 90 represents a set of flip flops for loading the output of the adder 96 on the basis of the output of the serial/parallel converting circuit 94, for being reset on the basis of the output of the AND circuit 91, and for outputting an inputted data as a vertical address signal when the inputted data is held by synchronizing with a clock inputting at an inputting terminal. Both the adder 96 and the set of flip flops comprise an vertical address counter. According to setting a data, which is supplied from the serial/parallel converting circuit 94 to the adder 96, to value 1, the vertical address counter constructs an simple increment counter. For example, according to setting the data to value 2, the vertical address counter constructs a counter for increasing by 2 from value 1. Reference numeral 92 represents a set of flip flops for generating a vertical address signal. Reference numeral 94 represents a serial/parallel converting circuit for setting a constant which serves as a initial value. Reference numerals 96 and 98 represent adders, 91 and 93 represent AND circuits and 95 represents a comparison circuit. Symbols RES represents a reset signal, RCK represents a read clock signal and MASK represents a mask signal.

Then, the operation will now be described. The adders 96 and 98 add the additional step number from the series/parallel converting circuit 94 to be described later to the outputs of the set of flip flops 90 and 92 so as to feed back the result of the additions to the set of flip flops 90 and 92. The series/parallel converting circuit 94 outputs initial values for generating a horizontal address and a vertical address to the set of flip flops 90 and 92. The series/parallel converting circuit 94 further outputs the additional step number to the adders 96 and 98, the series/parallel converting circuit 94 further outputting a signal for generating a horizontal to vertical ripple carry from the set of flip flops 90 to the set of flip flops 92 to the comparison circuit 95.

The count of the set of flip flops 90 is increased by the read clock RCK read from the initial value loaded from the series/parallel converting circuit 94. The AND circuit 93 masks the output (carry) of the comparison circuit 95 in response to the mask signal MASK. That is, when the level of the mask signal MASK is low, the set of flip flops 92 does not receive the ripple carry. Therefore, the vertical address 82V is not updated. As a result, the line reading is repeated freely.

The set of flip flops 90 and 92 are reset in response to the reset signal RES. The set of flip flops 90 is also reset by the output from the comparison circuit 95.

As described above, the function of reading the same line (in the case of writing, the function of performing writing on the memory cell 70C of the storage portion 70 at the same position) can be basically realized simply by adding the comparison circuit 95 and the AND circuit 93 to the conventional read counter. Therefore, the circuit does not become complicated and the size thereof is not excessively enlarged.

For example, in the case where the above-described FIFO memory 31 is adopted in a still-picture transmitting device, the structure must be arranged in such a manner that the level of the mask signal MASK is set to a low level and the mask signal is cancelled after checking the data re-transmission demand issued from the receiver when the desired data is, in a line unit, read from the FIFO memory 31 in the case where there is a possibility of the image data re-transmission. Thus, the necessity of resetting the address can be eliminated when data is transmitted again.

As described above, with the FIFO memory 31 (the FIFO memory 32 and the FIFO memory 33 included), the reading and writing of image data on the same line can be quickly and repeatedly conducted without the necessity of the address assignment.

Furthermore, data can be written at an optional position of the FIFO memory 31, the FIFO memory 32 and the FIFO memory 33 and data can be repeatedly read from an optional position of the same. Furthermore, size reduction and low cost can be realized.

Second Embodiment

A second embodiment of the present invention will now be described.

Figure 9A:
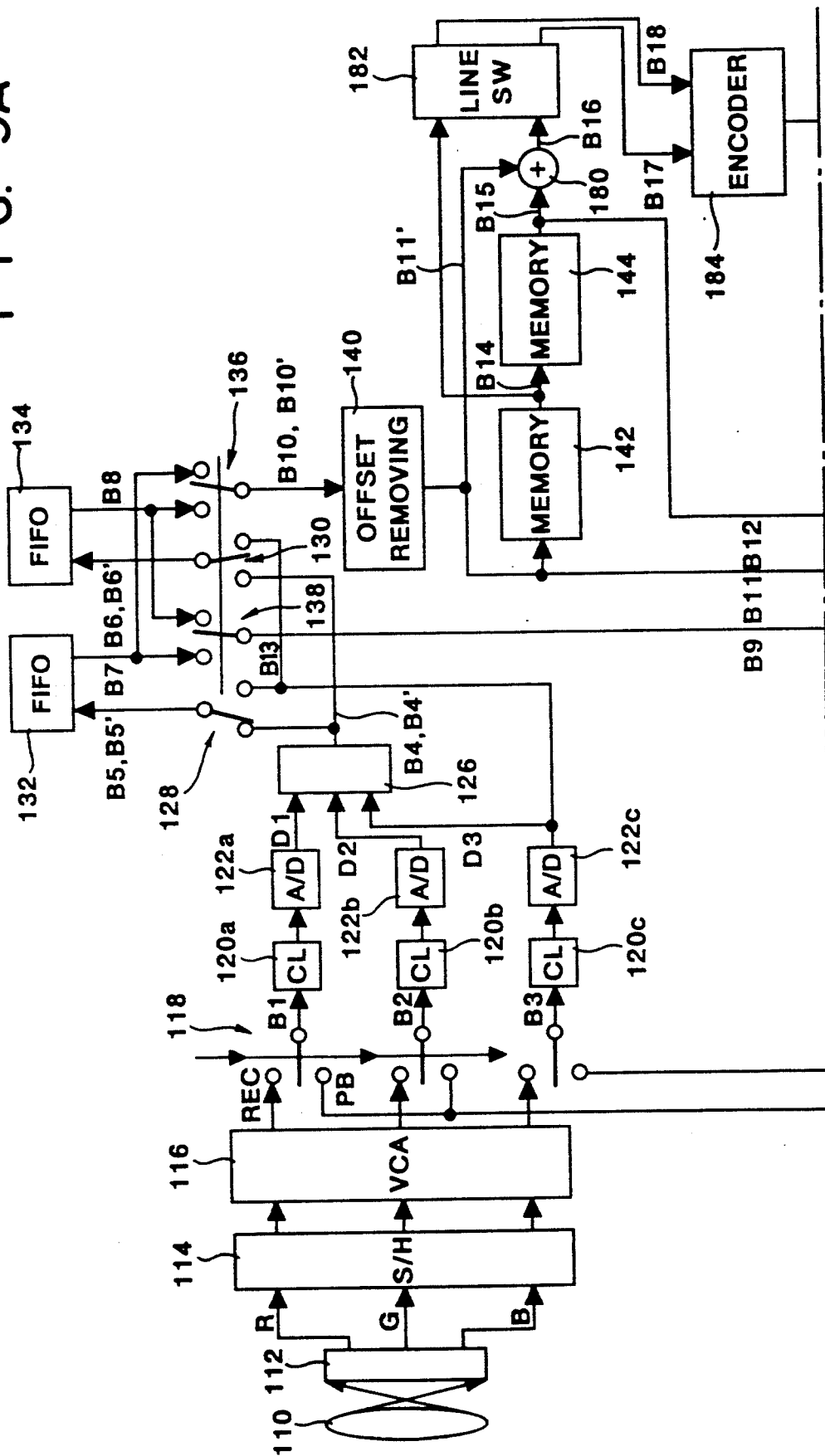
FIGS. 9A and 9B are block diagrams which illustrates a second embodiment of an electronic still camera.
Figure 9B:
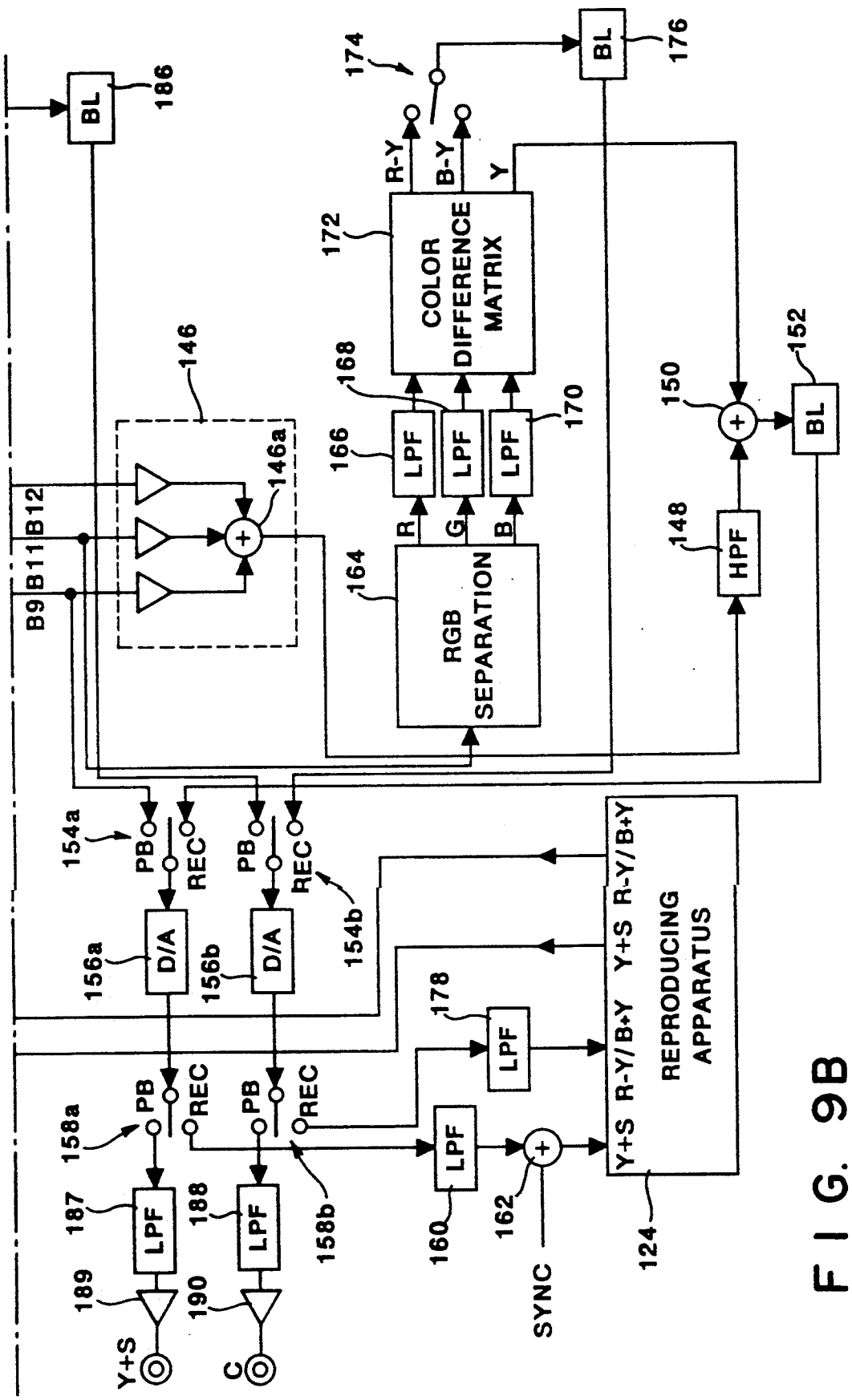

FIGS. 9A and 9B are block diagrams which illustrate the structure of an electronic still camera. Since a system control circuit which controls the whole operation of the camera, the exposure sensor and a sensor for measuring color do not concern the second embodiment, their 25 descriptions are omitted here. Referring to FIGS. 9A and 9B, an imaging lens 110, an imaging device 112, an S/H circuit 114 and a VCA 116 are structured similarly to the corresponding elements the imaging lens 10, the imaging device 12, the S/H circuit 14 and the VCA 16 according to the first embodiment of the present invention. Reference numeral 118 represents a switch for realizing the input of an image signal (data) to be recorded and the input of an image signal (data) to be reproduced. Reference numerals 120a to 120c represent clamp circuits and 122a to 122c represent A/D converters. Reference numeral 126 represents a switch capable of the switching operation at the triple speed similarly to the switch 28 according to the first embodiment. Reference numerals 132 and 134 represent FIFO memory serving as frame memories for storing image signals for odd lines and even lines. Reference numerals 128 and 130 represent switches for switching data to be written on the FIFO memories 132 and 134 at the time of the data recording and the data reproduction. Reference numerals 136 and 138 represent switches for switching the memory from which data is read between the FIFO memories 132 and 134. Reference numeral 140 represents an offset removal circuit, and 142 and 144 represent line memories serving as delay circuits structured by memory cells corresponding to the half of 1H line. Reference numerals 146a, 150, 162 and 180 represent adders, 182 represents a line switch, 184 represents an encoder, 189 and 190 represent output amplifiers. Reference numerals 160, 166, 168, 170, 178, 187 and 188 represent LPFs and reference numerals 152, 176 and 186 represent blanking circuits. Reference numeral 148 represents a high pass filter (HPF) and 146 represents a vertical filter having a similar structure to that of the vertical filter 36 according to the first embodiment. Reference numerals 156a and 156b represent D/A converters, and 154a, 154b, 158a and 158b represent switches for switching the input to correspond to the recording mode and the play back mode. Reference numeral 174 represents a switch for switching R-Y and B-Y. Reference numeral 164 represents an RGB separation circuit, 172 represents a color difference matrix circuit and 124 represents a recorded picture reproducing apparatus. Reference numeral 162 represents a synchronizing adder and symbols B1 to B18, B4', B5', B6', B10', B11', D1, D2 and D3 represent essential image signals.

The operation of the electronic still camera thus structured will now be described.

FIGS. 10A and 10B illustrate the state where the FIFO memories are used at the time of the recording operation. FIG. 11 illustrates a sampling point of a reproduction signal according to the second embodiment of the present invention. FIGS. 12A and 12B illustrate a state where the FIFO memories are used at time of the reproduction operation according to the second embodiment. FIGS. 13 to 17 are timing charts which illustrate the timing of each of the essential image signals according to the second embodiment of the present invention.

The optical image of the subject taken by the imaging lens 110 is converted into an electric signal by the imaging device 112. The R, G and B signals output from the imaging device 112 are sampled/held by the S/H circuit 114 and their exposure and the color balance are adjusted by the VCA 116. The R, G and B output signals B1, B2 and B3 from the VCA 116 are, via the switch 118 and the clamp circuit 120, supplied to the A/D converters 122a, 122b and 122c in which they are converted into digital values obtained by adding y-characteristics. The switch 118 is provided for the purpose of utilizing the circuit from the clamp circuit 120 at the time of processing of the reproduction signal supplied from the still video recorded picture reproducing apparatus 124. The clamp circuit 120 is used only at the reproduction operation.

Figure 13:
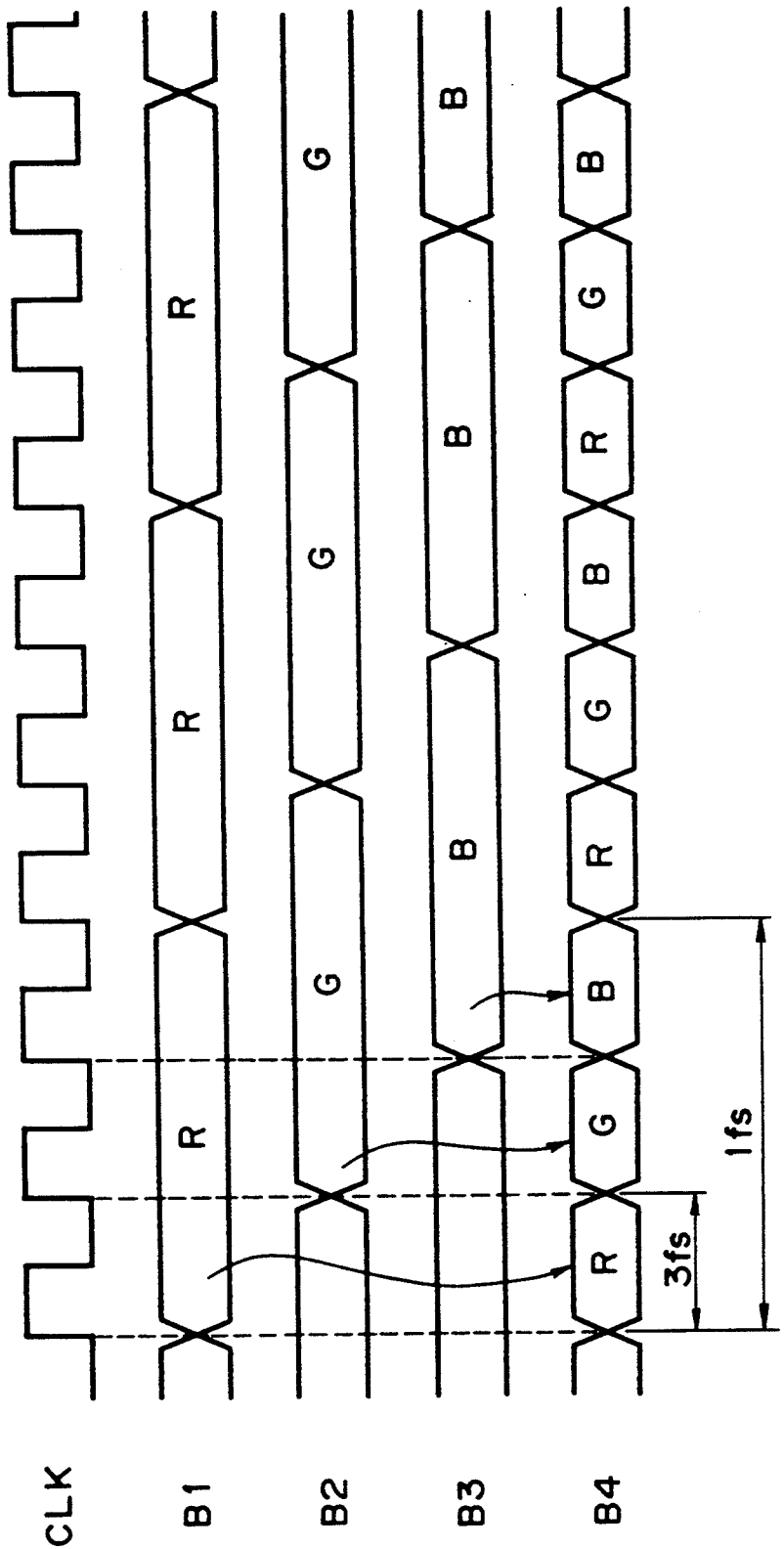
Figure 14:
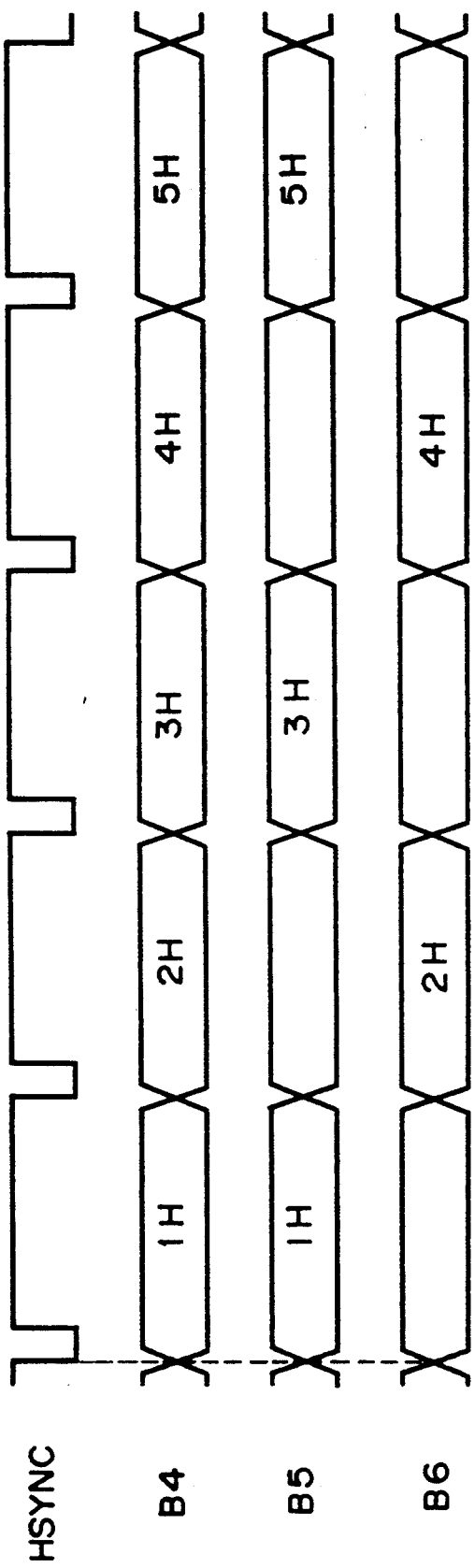

First, the flow of the signal at time of the recording operation will now be described. As shown in FIGS. 13, each of the R, G and B outputs from the A/D converters 122a, 122b, 122c is converted, by the switch 126 which can be switched at triple speed, into RGB sequential signal (switch-Y signal) B4. The thus obtained switch-Y signal B4 is, as shown in FIG. 10A, 10B and 14, arranged to pass in such a manner that an odd line signal B5 is distributed to the FIFO memory 132 and an even line signal B6 is distributed to the FIFO memory 134 by the switching operation performed by the switches 128 and 130 in response to a horizontal synchronizing (HSYNC) signal. The signals B5 and B6 written in the corresponding FIFO memories 132 and 134 are, as shown in FIG. 15, alternately read twice by a line unit as signals B7 and B8. The output signals from the FIFO memories 132 and 134 are output by the switching operation of switches 136 and 138 in response to the HSYNC signal. As a result, an output signal B10 is output from the switch 136 in the sequential order of the first line, the second line, the third line, the fourth line, . . . , while an output signal B9 is, at the same timing, output from the switch 138 in the sequential order of the second line, the third line, the fourth line, the fifth line, . . . . Therefore, the signals from the second line successively appear twice.

The output signal B10 from the switch 136 is supplied to a series circuit consisting of the two line memories 142 and 144 via the offset removal circuit 140 which does not work at the recording operation. Since the line memories 142 and 144 respectively serve as 0.5H line memories at the time of the recording operation, the output from the line memory 144 is delayed by 1H from the input to the line memory 142. The output signal B9 from the switch 138, the output signal (the signal which has passed through the offset removal circuit 140) from the switch 136 and a signal delayed from the former signal by 1H (at the recording operation, it is B12) are, as shown in FIGS. 9A and 9B, supplied to the vertical filter 146. Since the output signal B10 from the switch 136 delays from the output signal B9 from the switch 138 by 1H, the signals B9, B11 and B12 to be supplied to the vertical filter 146 are delayed by 0H (no delay), 1H and 2H at the same timing. In the vertical filter 146, a vertical aperture compensation is conducted at the above-described timing.

HPF 148 fetches the high frequency component from the output from vertical filter 146, while adder 150 adds the low-frequency Y-signal formed by a color signal processing performed in a color difference matrix circuit 172 to be described later to the output (high frequency component) from HPF 148. The result of the above-described addition is subjected to a blanking processing in the blanking circuit 152 so as to be supplied to the D/A converter 156 via the switch 154 which is switched at the recording and the reproducing operation so that it is converted into an analog signal. The thus obtained analog signal (Y) is supplied to the synchronizing adder 162 via the switches 158a and 158b and the LPF 160, the analog signal (Y) being then applied with a synchronizing signal (Sync) so as to be supplied to the recorded picture reproducing apparatus 124.

As for the processing of the color signal, RGB separation circuit 164 separates the RGB sequential signal supplied from the intermediate tap of the vertical filter 146 into R, G and B signal of ¼ period. The R, G and B outputs from RGB separation circuit 164 are subjected to the band limitation processing by LPFs 166, 168 and 170 before supplied to the color difference matrix circuit 172 in which they are converted into color difference signals R-Y and B-Y. Simultaneously, in color difference matrix circuit 172, low frequency Y-signal is formed so as to be supplied to the adder 150. Color difference signals R-Y and B-Y are made line sequential by switch 174 and are subjected to the blanking by the blanking circuit 176. The above-described signals are supplied to the recorded picture reproducing apparatus 124 via the switch 154, the D/A converter 156, the switches 158a and 158b and the LPF 178. Thus, the recording operation is completed.

The reproduction operation from the recorded picture reproducing apparatus will now be described. The D.C. level of each of a brightness signal (Y+S) and the line sequential color difference signals (R-Y, B-Y) supplied from the recorded picture reproducing apparatus 124 is fixed by the clamp circuit 120. The brightness signal (Y +S) and the line sequential color difference signals (R-Y, B-Y) are, as shown in FIG. 11, sampled by the A/D converter 122. The sampled digital signals D1, D2 and D3 are distributed to the FIFO memories 132 and 134 by the switches 128 and 130 as shown in FIGS. 12A and 12B. At this time, the switch 126 generates an output clock for each of the signals D1 and D2 in accordance with the basic clock 2 fs and outputs a line sequential signal B4' in accordance with the thus generated output clock. The signal B4' is output in such a manner that the same brightness signals are successively output at the period of 2 fs. The switch 128 establishes a connection with the signal B4' so that it is output as a brightness signal B5' to the FIFO memory 132, while the switch 130 establishes a connection with the signal D3 output from the A/D converter 122C so that it is output as a color difference signal B6' to the FIFO memory 134.

At the printing mode, according to each of locations of the FIFO memories 132 and 134, shown in FIG. 12A and FIG. 12B, both a brightness signal (Y+S) and a sequential color difference signals (R-Y, B-Y) of the field #1, that is the first field and both a brightness signal (Y+S) and a sequential color difference signals (R-Y, B-Y) of the field #2, that is the second field, respectively, are written on the FIFO memories 132 and 134.

The process of reproduced signals supplied from the recorded picture reproducing apparatus 123, namely, the process for writing the reproduced signals on the first field, will be described.

A brightness signal (Y+S) is supplied to the A/D converters 122a and 122b shown in FIG. 9A, and the brightness signal (Y+S) supplied from the switch 126 is the FIFO memory 132 via the switch 128. The above-mentioned signals are shown by the signals D1OUT, D2OUT, and B4 in FIG. 16. Besides the color difference signal (C) is written on the FIFO memory 134 via the switch 130 after performing the A/D conversion by the A/D converter 122c.

Figure 16:
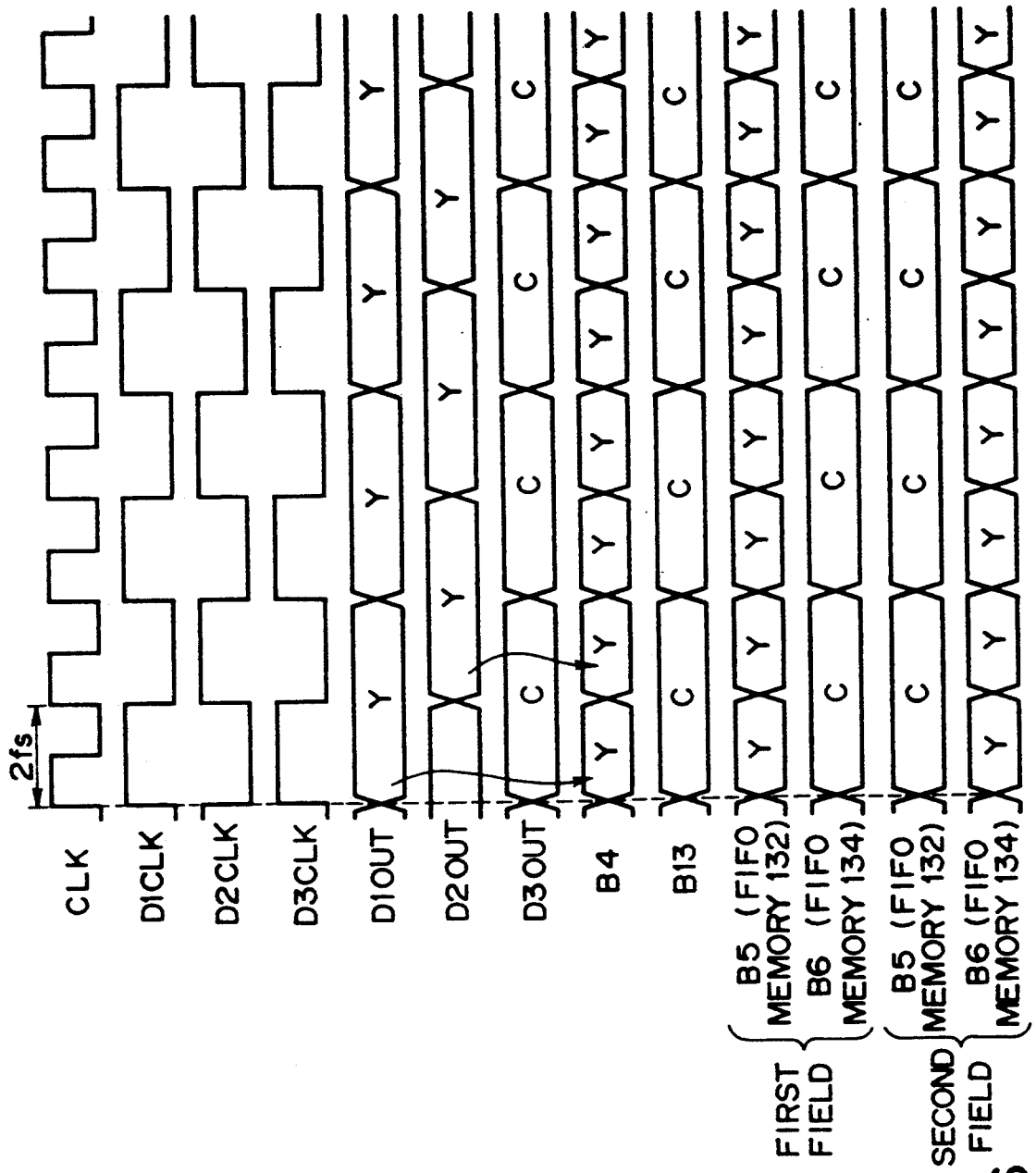

The area for memorizing a sequential color difference signals (R-Y, B-Y) is ¼ the size of the area for memorizing a brightness signal (Y+S), because the color difference signal (C) is written on the FIFO memory 134 after compression, namely, with the ¼ the quantity of the color difference signal (C) omitted. The above-mentioned signals are, as shown in FIG. 16, D3OUT and B13.

Next, in case of the process for writing the reproduced signals on the second field, the switches 128 and 130 respectively are switched in the opposite directions, and the process of the second field is performed as the above-mentioned process of the first field.

According to the process, the FIFO memories 132 and 134 constructed with little memory capacity can memorize image signals of one frame constructed by the first field and the second field.

As shown in FIG. 17, the signals read from the FIFO memories 132 and 134 are processed as follows: the brightness signal is supplied to the switch 154a by the switch 138, and the line sequential color difference signal B0' is supplied to the offset removal circuit 140 by the switch 136. The pedestal level of the R-Y component and that of the B-Y component of the color difference signal B10' are adjusted to be the same level by the offset removal circuit 140. The thus adjusted signal B1' is supplied, as the signal B15, to the adder 180 via the line memories 142 and 144. In the adder 180, the signal B11' which is the one line behind is added to the signal B15. As a result, a compensating signal B16 obtained by making the color difference signal line sequential is formed. The compensating signal B16 is arranged to be the line sequential color difference signals R-Y and B-Y by the line switch 182. The color difference signals R-Y and B-y are signals B17 and B18 shown in FIG. 17. The line sequential color difference signals B17 and B18 are converted into video signals of an NTSC (National Television System Committee) system by the encoder 184 before insertion of the blanking by the blanking circuit 186. In the reproduction operation, the line memories 142 and 144 respectively act as the line memories. The output signal from the blanking circuit 186 is supplied to the switch 154b.

The brightness signal (Y+S) and the color difference signal (C) of the reproduction signal are supplied to the switches 154a and 154b. The brightness signal (Y+S) and the color difference signal (C) are converted into analog signals by the D/A converts 156a and 156b respectively. The thus obtained analog signals are output from the output terminal via the switches 158a and 158b, the band limiting LPF 187 and 188 and the output amplifiers 189 and 190.

According to the second embodiment, since the number of the sections of the blocks of the FIFO memories which constituting the memories 132 and 134 can be reduced with respect to the first embodiment, an advantage can be obtained in that the number of pins necessary to structure the apparatus by IC can be reduced. Furthermore, since the line memories 142 and 144 are used as one line, the overall structure of the circuit can be simplified.

Although the invention has been described in its preferred forms with a certain degree of particularly, it is understood that other embodiments of the preferred forms have been changed in the details of construction and the combination and arrangement of parts may be resorted to without departing from the spirit and the scope of the invention as hereinafter claimed.

What is claimed is:

1. An image processing apparatus comprising:

receiving means for receiving digitized image data;

storage means for storing the received image data in such a manner that said storage means divides the received image data into a plurality of memory regions;

read means for simultaneously reading the image data stored in each of said plurality of memory regions; and supply means for supplying the image data which have been simultaneously read out to a vertical digital filtering process, wherein said read means includes read control means for controlling the reading in such a manner that the image data simultaneously read from said plurality of memory regions are arranged in the same sequential order in the sub-scanning direction as the sequential order when the image data has been received by said receiving means.

2. An image processing apparatus according to claim 1, wherein said receiving means includes means for forming the digitized image data by synthesizing brightness signals representing the corresponding color components into one series line signal.

3. An image processing apparatus according to claim 2, wherein the horizontal period of the digitized image data is substantially the same as the horizontal period of each of said brightness signals corresponding to the color components.

4. An image processing apparatus comprising:

receiving means for receiving digitized image data;

storage means for storing the received image data in such a manner that said storage means divides the received image data into a plurality of memory regions;

read means for simultaneously reading the image data stored in each of said plurality of memory regions; and supply means for supplying the image data which have been simultaneously read out to a vertical digital filtering process, wherein said each of memory regions further comprises:

line memory means for storing the received image data for a plurality of lines;

first generating means for generating a write address signal to be supplied to said line memory means;

second generating means for generating a read address signal to be supplied to said line memory means;

third generating means for generating a horizontal address signal when said write address signal or said read address signal has been generated, wherein said third means outputs a carry signal at a predetermined period; and fourth generating means for generating a vertical address signal in response to said carry signal outputted from said third generating means, said fourth generating means controlling the generation of said vertical address signal in response to a command issued from an external equipment.

5. An image processing apparatus according to claim 4, wherein the fourth generating means includes mask means for masking the carry signal in response to a mask signal supplied from said external equipment.

6. An image processing apparatus according to claim 4, wherein said read means includes read control means for controlling the reading in such a manner that the image data simultaneously read from said plurality of memory regions are arranged in the same sequential order in the sub-scanning direction as the sequential order when the image data has been received by said receiving means.

7. An image processing apparatus according to claim 6, wherein said read control means includes repeat means for repeatedly reading the same image data.

8. An image processing apparatus according to claim 7, wherein said repeat means repeatedly reads the same image data by at least the number corresponding to the number of said memory regions.

9. An image processing apparatus according to claim 4, wherein said receiving means includes means for forming the digitized image data by synthesizing brightness signals representing the corresponding color components into one series line signal.

10. An image processing apparatus according to claim 9, wherein the horizontal period of the digitized image data is substantially the same as the horizontal period of each of the brightness signals corresponding to the color components.

11. An image processing apparatus according to claim 1, wherein said read control means includes repeat means for repeatedly reading the same image data.

12. An image processing apparatus according to claim 11, wherein said repeat means repeatedly reads the same image data by at least the number corresponding to the number of said memory regions.

* * * * *

UNITED STATES PATENT AND TRADEMARK OFFICE
CERTIFICATE OF CORRECTION

PATENT NO. : 5,325,189
DATED : June 28, 1994
INVENTOR(S) : TOSHIHIKO MIMURA

It is certified that error appears in the above-indentified patent and that said Letters Patent is hereby corrected as shown below:

COLUMN 1:

Line 48, "device" should read --devices--.
    Line 49, "a" should be deleted.
    Line 61, "fetched" should read --fetched,--.

COLUMN 2:

Line 26, "reduce." should read --reduced.--.
    Line 29, "data .necessitating" should read --data necessitating a--.
    Line 59, "divi-" should be deleted.
    Line 60, "de/storage" should read --divide/storage--.
    Line 66, "Another" should read --other--.

COLUMN 3:

Line 19, "trates" should read --trate--.
    Line 51, "numeral 14 a" should read --numeral 14 represents a--.
    Line 55, "2 6" should read --26--.

COLUMN 4:

Line 1, "circuit." should read --circuits.--.
    Line 19, "adjust" should read --adjusts--.
    Line 51, "occur" should read --occurs--.
    Line 52, "is" (first occurrence) should be deleted.
    Line 68, "line," should read --line--.

UNITED STATES PATENT AND TRADEMARK OFFICE
CERTIFICATE OF CORRECTION

PATENT NO. : 5,325,189
DATED : June 28, 1994
INVENTOR(S) : TOSHIHIKO MIMURA

It is certified that error appears in the above-indentified patent and that said Letters Patent is hereby corrected as shown below:

COLUMN 5:

Line 2, "four" should read --fourth--.
Line 31, "outputs" (second occurrence) should be deleted.
Line 51, "outputted" should read --output--.

COLUMN 6:

Line 19, "outputted" should read --output--.
Line 41, "while and" should read --while--.

COLUMN 7:

Line 11, "outputted." should read --output.
Line 29, "data to" should read --data is to--.
Line 39, "outputted" should read --output--.
Line 52, "an inputted" should read --input--.
Line 53, "inputted" should read --input--.
Line 56, "an" should read --a--.
Line 58, "an" should read --a--.
Line 66, "a" should read --an--.

COLUMN 8:

Line 67, "25" should be deleted.

COLUMN 9:

Line 2, "elements" should read --elements:--.
Line 68, "y-charac-" should read --$\gamma$-charac- --.

UNITED STATES PATENT AND TRADEMARK OFFICE
CERTIFICATE OF CORRECTION

PATENT NO. : 5,325,189
DATED : June 28, 1994
INVENTOR(S) : TOSHIHIKO MIMURA

It is certified that error appears in the above-indentified patent and that said Letters Patent is hereby corrected as shown below:

COLUMN 10:

Line 7, "at time" should read --at the time--.
    Line 8, "FIGS. 13," should read --FIG. 13,--.

COLUMN 11:

Line 26, "is" should read --are--.
    Line 47, "a" (second occurrence) should be deleted.
    Line 50, "a" should be deleted.
    Line 60, "is" should read --to--.
    Line 67, "a" should be deleted.

COLUMN 12:

Line 3, "the ¼ the" should read --¼ the--.
    Line 27, "the" should be deleted.
    Line 33, "B-y" should read --B-Y--.
    Line 46, "D/A converts 156a and 156b" should read --DA converters 156a and 156b--.
    Line 53, "constituting" should read --constitute--.
    Line 61, "particularly," should read --particularity,--.

COLUMN 13:

Line 13, "said" should read --the--.

COLUMN 14:

Line 8, "putted" should read --put--.
    Line 22, "has" should read --have--.

UNITED STATES PATENT AND TRADEMARK OFFICE
CERTIFICATE OF CORRECTION

PATENT NO. : 5,325,189
DATED : June 28, 1994
INVENTOR(S) : TOSHIHIKO MIMURA

It is certified that error appears in the above-indentified patent and that said Letters Patent is hereby corrected as shown below:

COLUMN 14:

Line 8, "putted" should read --put--.
Line 22, "has" should read --have--.

Signed and Sealed this

Seventh Day of February, 1995

Attest:

BRUCE LEHMAN

Attesting Officer     Commissioner of Patents and Trademarks